US012497793B2

(12) United States Patent
Ervin et al.

(10) Patent No.: US 12,497,793 B2
(45) Date of Patent: Dec. 16, 2025

(54) FIBER-REINFORCED POLYMER ANCHORS AND CONNECTORS FOR REPAIR AND STRENGTHENING OF STRUCTURES CONFIGURED FOR FIELD TESTING, AND ASSEMBLIES FOR FIELD TESTING THE SAME

(71) Applicant: Kulstoff Composite Products, LLC, Austin, TX (US)

(72) Inventors: Timothy R. Ervin, Napa, CA (US); Ravindra V. Kanitkar, Berkeley, CA (US); Christopher R. Lewis, Austin, TX (US)

(73) Assignee: KULSTOFF COMPOSITE PRODUCTS, LLC, Austin, TX (US)

( * ) Notice: Subject to any disclaimer, the term of this patent is extended or adjusted under 35 U.S.C. 154(b) by 628 days.

(21) Appl. No.: 17/507,654

(22) Filed: Oct. 21, 2021

(65) Prior Publication Data

US 2022/0186759 A1 Jun. 16, 2022

Related U.S. Application Data

(60) Provisional application No. 63/094,821, filed on Oct. 21, 2020.

(51) Int. Cl.
*E04G 23/02* (2006.01)
*G01M 5/00* (2006.01)

(52) U.S. Cl.
CPC .. *E04G 23/0218* (2013.01); *E04G 2023/0251* (2013.01); *E04G 2023/0262* (2013.01); *G01M 5/005* (2013.01)

(58) Field of Classification Search
CPC ........ E04G 23/0218; E04G 2023/0262; E04G 2023/0251; E04G 2023/0255; E04G 2023/0259; E04C 5/07; E04C 5/073; G01M 5/005
See application file for complete search history.

(56) References Cited

U.S. PATENT DOCUMENTS

| | | | | |
|---|---|---|---|---|
| 4,648,224 | A | 3/1987 | Kitta et al. | |
| 5,580,642 | A | 12/1996 | Okamoto et al. | |
| 5,937,606 | A | 8/1999 | Meier et al. | |
| 6,145,260 | A * | 11/2000 | Morton | E04G 23/0218 52/746.1 |
| 6,389,775 | B1 | 5/2002 | Steiner et al. | |
| 6,418,684 | B1 * | 7/2002 | Morton | E04G 23/0218 52/309.1 |

(Continued)

FOREIGN PATENT DOCUMENTS

| | | | |
|---|---|---|---|
| JP | H06248758 A | * | 9/1994 |
| JP | 2003161002 A | * | 6/2003 |

(Continued)

*Primary Examiner* — Theodore V Adamos
(74) *Attorney, Agent, or Firm* — MH2 TECHNOLOGY LAW GROUP LLP

(57) ABSTRACT

A fiber reinforced polymer (FRP) anchor configured for field testing includes a precured end portion at a first end of the FRP anchor, a plurality of rovings extending from the precured end portion to free ends at a second end of the FRP anchor wherein the rovings being splayed in a first plane, and a pair of plates disposed at opposite sides of the rovings relative to the first plane. The plates are cured to the splayed rovings.

17 Claims, 10 Drawing Sheets

(56) References Cited

U.S. PATENT DOCUMENTS

| | | | | |
|---|---|---|---|---|
| 6,511,727 | B1 | 1/2003 | Bleibler et al. | |
| 7,056,463 | B2 * | 6/2006 | Ohta | B28B 23/046 156/169 |
| 7,207,149 | B2 | 4/2007 | Fyfe et al. | |
| 7,574,840 | B1 * | 8/2009 | Fyfe | E04B 5/023 52/223.13 |
| 7,930,863 | B1 | 4/2011 | Fyfe | |
| 7,946,088 | B1 | 5/2011 | Fyfe et al. | |
| 7,980,033 | B1 * | 7/2011 | Fyfe | E04B 7/04 52/223.13 |
| 8,496,404 | B1 | 7/2013 | Fyfe | |
| 8,511,043 | B2 | 8/2013 | Fyfe | |
| 8,713,891 | B2 | 5/2014 | Carr et al. | |
| 8,776,474 | B2 * | 7/2014 | Wu | E04C 5/00 52/698 |
| 8,784,006 | B2 | 7/2014 | Fyfe | |
| 8,795,832 | B2 | 8/2014 | Fyfe et al. | |
| 9,290,957 | B1 * | 3/2016 | Wheatley | E04G 23/0229 |
| 9,574,359 | B2 * | 2/2017 | Berset | E04C 5/07 |
| 2004/0016200 | A1 * | 1/2004 | Fyfe | E04G 23/0218 52/698 |
| 2005/0241260 | A1 | 11/2005 | Wheatley | |
| 2009/0013625 | A1 | 1/2009 | Tourneur et al. | |
| 2009/0044476 | A1 | 2/2009 | Agneloni | |
| 2009/0211194 | A1 | 8/2009 | Fyfe et al. | |
| 2011/0036029 | A1 * | 2/2011 | Tourneur | E04G 23/0218 52/309.1 |
| 2011/0219710 | A1 | 9/2011 | Fyfe | |
| 2012/0047841 | A1 | 3/2012 | Fyfe et al. | |
| 2012/0110940 | A1 | 5/2012 | Hemphill | |
| 2012/0180412 | A1 * | 7/2012 | Secrest | E04B 1/92 52/741.3 |
| 2013/0008111 | A1 * | 1/2013 | Wu | E04G 23/0218 52/831 |
| 2016/0053503 | A1 * | 2/2016 | Ervin | E04G 23/0218 52/741.3 |
| 2022/0120104 | A1 * | 4/2022 | Ramirez | E04G 23/0244 |
| 2023/0015704 | A1 * | 1/2023 | Zampa | E04C 5/07 |
| 2023/0250655 | A1 * | 8/2023 | Ramirez | B32B 5/26 52/514 |

FOREIGN PATENT DOCUMENTS

| | | | | | |
|---|---|---|---|---|---|
| JP | 3870364 | B2 | * | 1/2007 | E04C 5/07 |
| KR | 100693873 | B1 | * | 3/2007 | |
| KR | 20080111664 | A | * | 12/2008 | |
| WO | WO-02103137 | A1 | * | 12/2002 | E04C 5/07 |
| WO | WO-2013113442 | A1 | * | 8/2013 | E04G 23/0218 |

* cited by examiner

FIBER-REINFORCED POLYMER ANCHORS AND CONNECTORS FOR REPAIR AND STRENGTHENING OF STRUCTURES CONFIGURED FOR FIELD TESTING, AND ASSEMBLIES FOR FIELD TESTING THE SAME

TECHNICAL FIELD

The present disclosure relates generally to anchors and connectors, for example, fiber-reinforced polymer anchors and connectors, which are used for reinforcing a structure. More particularly, the disclosure relates to fiber-reinforced polymer anchors and connectors that are configured for field testing and assemblies for field testing such fiber-reinforced polymer anchors and connectors.

BACKGROUND

The stock of existing infrastructure (including buildings, bridges, tunnels, tanks, pipes, support structures in industrial facilities) is enormous. Financial and operational pressures necessitate that such infrastructure be continually maintained. Such maintenance often involves repair and strengthening of such structures or their individual elements. In the past two decades surface mounted reinforcements have gained widespread acceptance for such repair and strengthening. These surface mounted reinforcing materials include, but are not limited to, fiber reinforced polymers (FRP), fiber reinforced cementitious matrices, fiber reinforced coatings as well as prefabricated panels utilizing a variety of materials. Typically such surface mounted reinforcements are attached to existing structural surfaces by adhesion. The adhesives can range from epoxies, vinyl esters, phenolic materials, cementitious materials etc. It is well understood that such surface mounted reinforcements will de-bond from the structural surfaces when the strains in the reinforcement material reach some threshold values. Such debonding failures are often sudden and catastrophic. In addition, such debonding failures occur at strength or strain values far below the available strength/strain of such surface mounted reinforcing materials, thus resulting in under-utilization of the full potential of such materials. Research has also demonstrated that such debonding failures can be mitigated or delayed by the use of anchors which tie the surface mounted reinforcements deeper into the structural members rather than relying of surface adhesion only.

FRP based anchors and connectors are used to enhance bond/attachment for and to create continuity of surface mounted repair and strengthening systems. Anchors and connectors comprise fiber rovings, which in turn are composed of fiber filaments, and adhesives. Examples of such anchors and connectors are described in U.S. Pat. No. 9,784,004, the disclosure of which is incorporated herein by reference.

For example, as shown in FIG. 6A, an exemplary anchor 600 includes a bundle 660 of fibers/rovings 605. The bundle 660 comprises loose lengths of the flexible fibers/rovings 605. The fibers/rovings 605 are all generally the same length and are arranged together so that the bundle 660 is approximately the same length as the fibers/rovings 605. The fibers/rovings 605 can be filaments made of any material including, but not limited to, carbon, glass, basalt, steel, graphite, nylon, aramid, high-modulus polyethylene, ceramic, quartz, PBO, fullerene, LCP, or other synthetic or organic/natural material that can be manufactured in long fibers/rovings.

In some exemplary embodiments an anchor 600 may include, but is not limited to, 400,000 to 5,000,000 fibers. Of course, an anchor 600 may include more than 5,000,000 fibers or less than 400,000 fibers, as dictated by the application. In some exemplary embodiments, a roving may include, but is not limited to, 3000-48,000 fibers. Of course, a roving 605 may include more than 48,000 fibers or less than 3000 fibers, as dictated by the application. Further, in some exemplary embodiments, an anchor 600 may include, but is not limited to, upwards of 200 rovings. Of course, an anchor 600 may include more or less than 200 rovings, as dictated by the application. It should be appreciated that these numbers are merely exemplary and are in no way intended to limit the embodiments of the disclosure.

The anchors 600 include a first end 602 and a second end 604, with a reinforced portion 606 at the first end 602 and free ends 608 of the fibers/rovings 605 at the second end 604. The free ends 608 of the rovings 605 can be splayed, or spread apart by a user, as shown in FIG. 6B.

The anchors 600 may be shop fabricated with the first end 602 precured and formed to the correct length, with the proper fiber/roving count, and cross-section, including but not limited to circular, oval, and rectangular, such that the first end 602 can be inserted into drilled holes in an existing structural members. The first end 602 may be encapsulated in an adhesive to form the precured and formed reinforced portion 606. The pre-cured and formed reinforced portion 606 can be cured in a variety of ways, including but not limited to, ambient and/or high-temperature, exposure to UV light or use of specialty curing additives.

Anchors are inserted into holes drilled in existing structural elements and are used to anchor surface mounted strengthening systems to the structural member being repaired/strengthened or to connect the surface mounted strengthening systems to adjacent structural elements to provide force-transfer or to terminate a surface mounted strengthening system. Anchors can be assembled in the field or shop fabricated. The field assembled anchors take a predetermined amount of fiber roving that is field-saturated with a field mixed adhesive and inserted in drilled holes, while the shop-fabricated anchors have a precured end of the correct diameter and/or length that is inserted into drilled holes filled with adhesive.

The anchors provide significantly higher bond/adhesion of the surface mounted reinforcement to the structure resulting in greater strength capacity and utilization of the surface-mounted reinforcement. The anchors also provide for the transfer of forces between the structure and the structural element being repaired or strengthened. The anchors also delay failure of the structural system at higher than expected loads, such as for seismic resistance. The anchors and connectors increase structural ductility and resistance to lateral forces.

While the FRP anchors can have quality control procedures in place that verify the constituent materials supplied and that the manufacture of the field or shop fabricated anchors meets or exceeds the manufacturer's requirements, the actual capacity of the installed anchors is dependent upon the quality of the field installation of the product. This is an issue of quality assurance of procedures developed to ensure proper field preparation and installation of the anchors to provide a finished structure that, once constructed per the approved project drawings, complies with the approved design intent. Conventional materials and products are routinely field tested for quality control and assurance compliance. Such quality assurance testing is typically prescribed by standards such as the International Building Code (IBC). Although the design of FRP and FRP anchors is not covered in the International Building Code, Chapter 17 subsection 17.05.1.1 Special Cases of IBC 2018 sets forth special inspection requirements for such testing of FRP that can be considered as an alternative to materials and systems prescribed by code.

Use of FRP anchorage has increased as acceptance by some of the larger state and federal agencies such as the Department of Defense and the State Department of Transportation of CA, OR, WA, TX, and FL to name a few have accepted FRP anchors as part of the design on various FRP strengthening projects. Also, associations such as the American Association of State Highway and Transportation Officials (AASHTO), that governs the design of Bridges, have added FRP anchors as part of the design guide for the repair and strengthening of concrete highway bridge structures, AASHTO Guide Specifications for the Design of Bonded FRP Systems for Repair and Strengthening of Concrete Bridge Elements. FRP anchors have also been included in the American Concrete Institute, (ACI) design guide for FRP strengthening, ACI 440.2R Guide for the Design and Construction of Externally bonded FRP Systems for Strengthening Concrete Structures with examples of detailing of various FRP anchoring systems and mention of the research showing the benefits of anchorage to the effectiveness of FRP systems.

Although the acceptance and utilization of FRP anchors has increased significantly, the current state of practice for anchor installation has several limitations:

1. Verification of the efficacy of FRP anchors is based solely upon research-driven testing done primarily in university and other research laboratories.
2. Presently the only quality assurance for FRP anchor installation is to follow the manufacturer's installation guidance. Field produced FRP anchors are composed of rovings, which are then installed with tools into holes filled with adhesive. Since the rovings and filaments are flexible, there is no visual or other verification that the anchors have reached the required embedment depth or that they are not damaged in any way in the holes during the installation.
3. There is no way to know how these field-produced anchors compare to the ones prepared for testing in a laboratory. In addition, there is no currently available method to ascertain if the anchor installation in the field complies with that used in the laboratory testing.
4. In some instances, engineering plans will actually provide a required strength that the anchors have to provide. In this case it is very difficult for installers or inspectors to know the rating for such anchors when they are ready to be installed in the field.
5. Unlike other anchors systems such as steel mechanical and adhesive anchors that can be, and are often, tested in the field to verify quality control and assurance, no such tests are currently are available for FRP anchors.

The invention described herein addresses one or more of these deficiencies.

SUMMARY

According to various aspects of the disclosure, fiber reinforced polymer (FRP) anchors and connectors are conventionally used to enhance bond/attachment for and to create continuity of surface mounted repair and strengthening systems in building structures. Anchors and connectors comprise fiber rovings, which in turn are composed of fiber filaments, and adhesives. Examples of such anchors and connectors are described in U.S. Pat. No. 9,784,004, the disclosure of which is incorporated herein by reference.

Anchors are inserted into holes drilled in existing structural elements and are used to anchor surface mounted strengthening systems to the structural member being repaired/strengthened or to connect the surface mounted strengthening systems to adjacent structural elements to provide force-transfer or to terminate a surface mounted strengthening system. Anchors are either field or shop fabricated with one end preformed to the required diameter and/or length. The preformed end can have integrated surface deformation or roughness to enhance and promote adhesion of the embedded end of the anchor in the hole. The other end of the anchor has free ends of rovings such that the filaments can be distributed or splayed, and adhered with adhesive, onto a surface of a structure strengthening system of the strengthened member or onto adjacent members.

The anchors provide significantly higher bond/adhesion of the surface mounted reinforcement to the structure resulting in greater strength capacity and higher utilization of the surface-mounted reinforcement. The anchors also provide for the transfer of forces between the structure and the structural element being repaired or strengthened. The anchors also delay failure of the structural system at higher loads. The anchors and connectors increase structural ductility and resistance to lateral forces.

According to various aspects of the disclosure, a fiber reinforced polymer (FRP) anchor configured for field testing includes a precured end portion at a first end of the FRP anchor, a plurality of rovings extending from the precured end portion to free ends at a second end of the FRP anchor wherein the rovings being splayed in a first plane, and a pair of plates disposed at opposite sides of the rovings relative to the first plane. The plates are cured to the splayed rovings.

Further advantages and embodiments may be apparent from the appended drawings.

DETAILED DESCRIPTION

FIGS. 1A through 5 below show the present invention in detail. In particular, FIGS. 1A-4B illustrate various exemplary field test FRP anchors and field test assemblies.

Figures 1A, 1B:
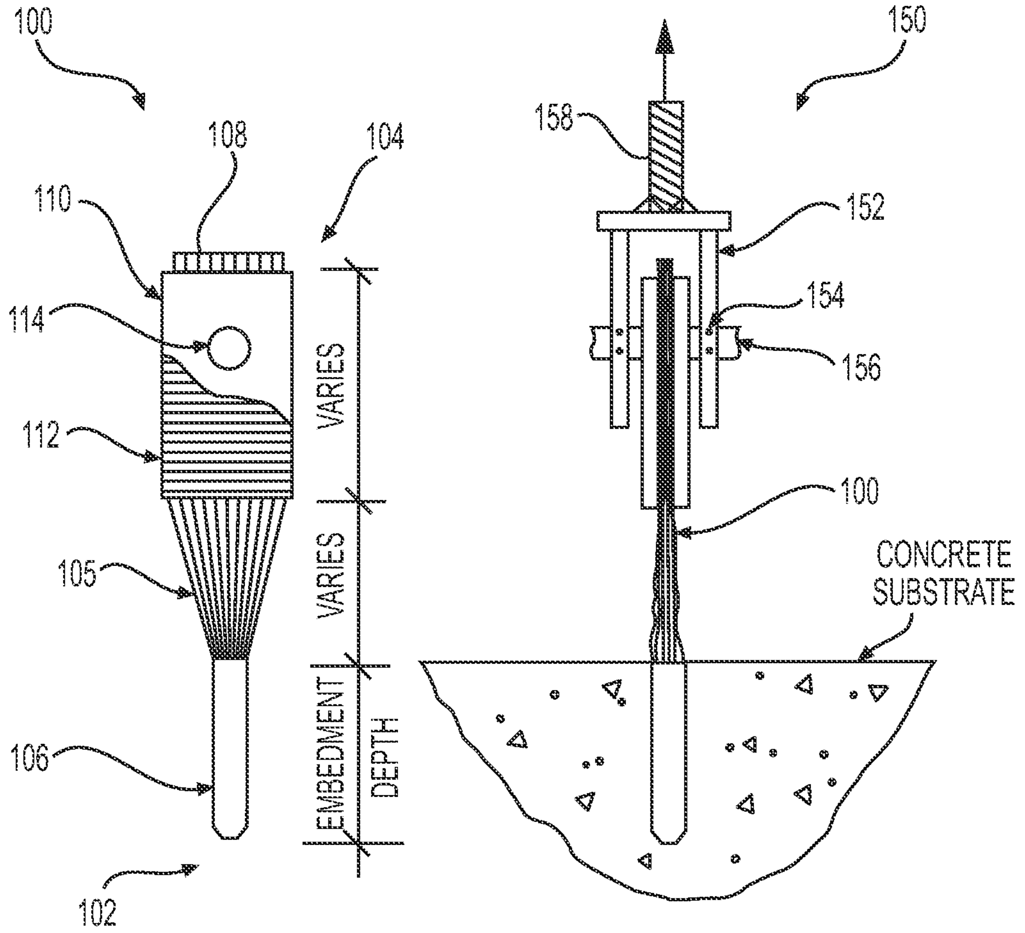
FIG. 1A illustrates a first exemplary field test FRP anchor in accordance with various aspects of the disclosure.
FIG. 1B illustrates a first exemplary field test FRP anchor assembly in accordance with various aspects of the disclosure.

FIG. 1A illustrates an FRP anchor 100, for example, a shop fabricated FRP anchor, configured for field testing. The anchor 100 includes a first end 102 and a second end 104. The first end 102 includes a precured or field cured end portion 106 having a diameter and length sized to be inserted into a hole drilled in a concrete substrate and filled with adhesive. The FRP anchor 100 includes rovings 105 that extend from the precured end portion 106 to free ends 108 at the second end 104 and are spread out and saturated with an adhesive. The rovings 105 at the second end 104 of the FRP anchor 100 are sandwiched between two steel plates 110. In some embodiments, the plates 110 may include grooves (FIG. 7A) cut into a side of one or both of the plates 110 that is in contact with the FRP rovings 105. The plates 110 may be of a material other than steel and other deformities could be used in place of grooves. The plate surfaces in contact with the rovings 105 may also be prepared to create a surface profile that will promote mechanical adhesion with the adhesive saturated rovings. For example, the surfaces in contact with the rovings 105 may be sandblasted, roughened by grinding or other mechanical means.

The plates 110 are spaced from the precured end portion 106 by a distance that can be varied as desired. The surfaces of the plates that engage the rovings may include FRP fabrics that extend from the first end to the second end of the plates. The rovings of the FRP fabrics create grooves in order to enhance gripping between the plates 110 and the rovings 105 upon curing.

In some embodiments, FRP roving 112 and/or FRP fabric can be placed around the plates 110 and FRP anchor 100 to stabilize or clamp the plates 110 being clamped to the FRP anchor during field testing. Alternatively, clamping of the plates 110 to the FRP anchor 100 can be done by various conventional clamping assemblies being placed around the plates 110 and FRP anchor 100.

Each of the plates 110 includes a through hole 114, and the holes 114 are aligned with one another so that a pin can be inserted through the first and second plates and through the rovings 105 at the second end 104 of the anchor 100. Alternatively, the through holes 114 may not be required if the field testing apparatus can otherwise grip an end of the plates 110 proximate the free ends 108 of the rovings 105.

FIG. 1B illustrates an assembly 150 for field testing the FRP anchor 100 illustrated in FIG. 1A. The assembly 150 includes a clevis loading bracket 152, which may comprise one or more steel plates (welded, bolted, or otherwise connected together in the case of multiple plates). The bracket 152 includes holes 154 that are configured to be aligned with the holes 114 through the plates 110 of the FRP field test anchor 100. A pin 156 is inserted through the holes 114 of the plates 110 of the FRP field test anchor 100 and the holes 154 of the bracket 152. The pin 156 may be held in place by any conventional means such as, for example, cotter pins or nuts. The clevis bracket 152 may also include a threaded rod 158, for example, welded thereto and configured to be coupled with a conventional center hole actuator and load cell so that the strength of the anchor 100 can be measured (see, e.g., FIG. 5). The rod 158 extends from the bracket 152 in a direction opposite to a direction in which the precured end of the anchor 100 extends relative to the bracket 152. One example of a center hole actuator and load cell and system for testing is illustrated and described in U.S. Pat. No. 9,874,503, the disclosure of which is incorporated herein by reference.

Figures 2A, 2B:
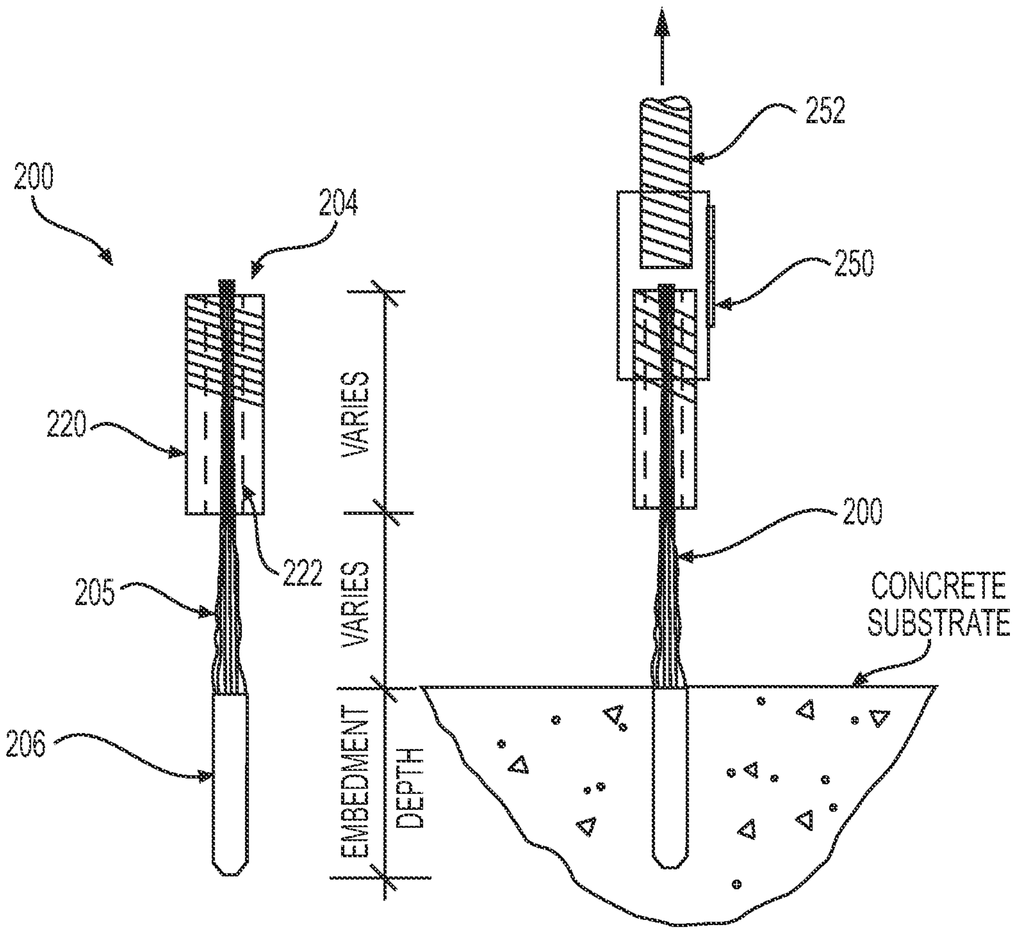
FIG. 2A illustrates a second exemplary field test FRP anchor in accordance with various aspects of the disclosure.
FIG. 2B illustrates a second exemplary field test FRP anchor assembly in accordance with various aspects of the disclosure.

FIG. 2A illustrates another FRP anchor 200, for example, a shop-fabricated FRP anchor, configured for field testing. The anchor 200 includes a first precured or field cured end portion 206 having a diameter and length sized to be inserted into a hole drilled in a concrete substrate and filled with adhesive. Rovings 205 of the FRP anchor 200 that extend from the precured end are saturated with an adhesive and collected together for insertion through a throughbore 222 in a hollow rod 220. The interior of the throughbore may be threaded or otherwise modified to enhance the bond between the hollow rod 220 and the anchor 200. The hollow rod 220 is at a second end 204 of the field test anchor 200 and is spaced from the precured end portion 206 by a distance that can be varied as desired. An end 224 of the hollow rod 220 that is distal relative to the precured end portion 206 may be threaded in order to be coupled, via a coupler 250, with a threaded rod 252 that extends from a conventional center hole actuator (not shown), as shown in FIG. 2B. The field test anchor 200 can thus be coupled with the conventional center hole actuator and load cell so that the strength of the anchor 200 can be measured.

Figure 3A:
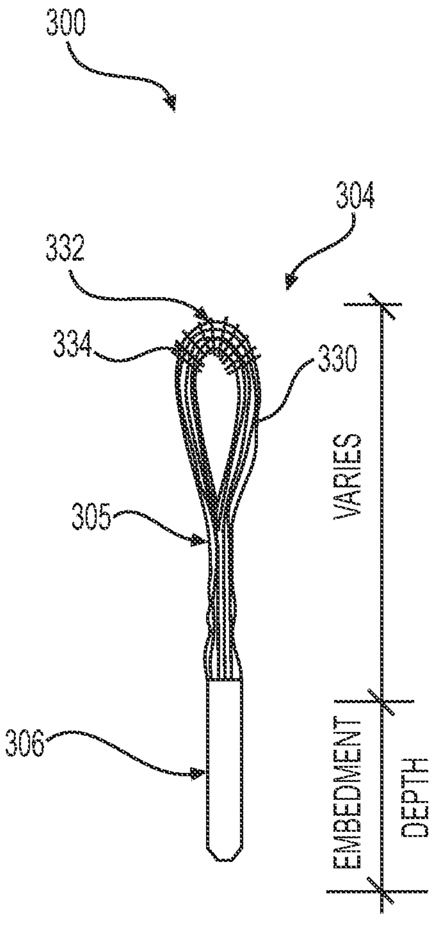
FIG. 3A illustrates a third exemplary field test FRP anchor in accordance with various aspects of the disclosure.
Figure 3B:
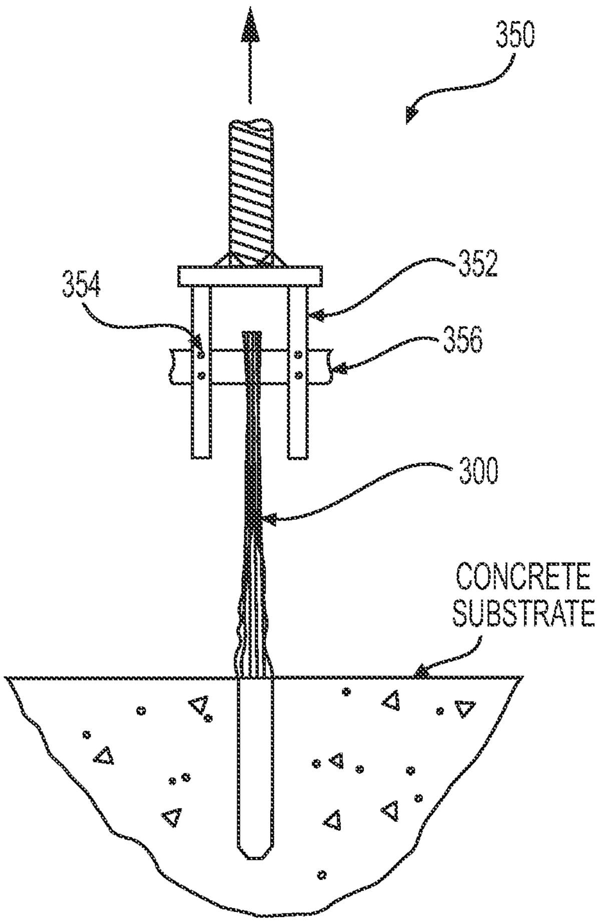
FIG. 3B illustrates a third exemplary field test FRP anchor assembly in accordance with various aspects of the disclosure.

FIG. 3A illustrates another anchor 300, for example, a shop-fabricated FRP anchor, configured for field testing. The anchor 300 includes a first precured or field cured end portion 306 having a diameter and length sized to be inserted into a hole drilled in a concrete substrate and filled with adhesive. Rovings 305 of the FRP anchor 300 that extend from the precured end portion 306 are saturated with an adhesive and formed into a loop 330, such that the loop 330 is disposed at a second end 304 of the anchor 300. The end 332 of the loop 330 that is distal relative to the precured end portion 306 may be hardened at its inner surface by metal pieces 334, for example, U-shaped pieces, that are saturated with adhesive and cured with the rovings 305. Similar to the field test assembly illustrated in FIG. 1B, a pin 356 is inserted through the loop 330 of the FRP field test anchor 300 and holes 354 of a clevis bracket 352.

Figure 4A:
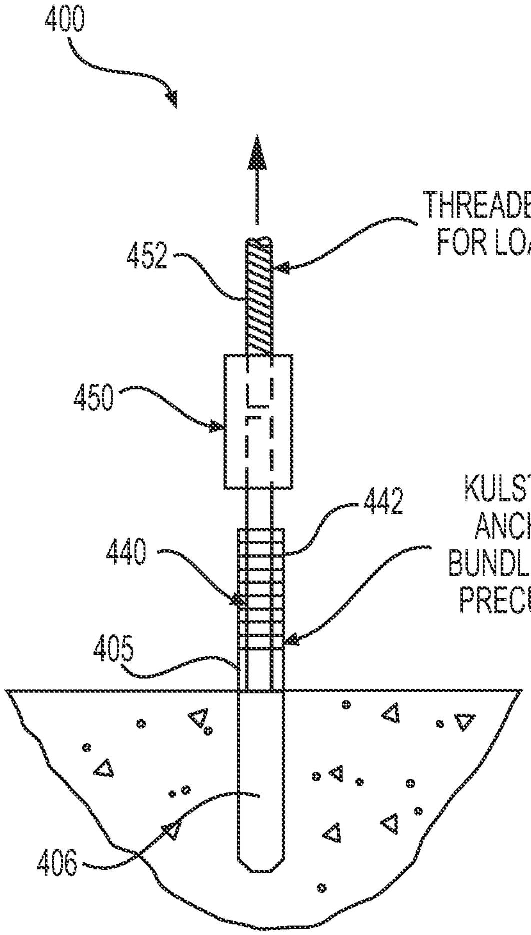
FIG. 4A illustrates a fourth exemplary field test FRP anchor assembly in accordance with various aspects of the disclosure.

Referring to FIG. 4A, another anchor 400, for example, a shop-fabricated FRP anchor, configured for field testing includes a first precured or field cured end portion 406 having a diameter and length sized to be inserted into a hole drilled in a concrete substrate and filled with adhesive. Rovings 405 of the FRP anchor 400 that extend from the precured end portion 406 are bundled about a steel rod 440, for example, a threaded steel rod. As shown, the steel rod 440 extends out from the bundled rovings 405 in a direction opposite to the precured end portion 406 so as to be configured to be coupled, via a coupler 450, with a threaded rod 452 that extends from a conventional center hole actuator (not shown), similar to that shown in FIG. 2B. The field test anchor 400 can thus be coupled with the conventional center hole actuator and load cell so that the strength of the anchor 400 can be measured. The bundled rovings 405 and embedded rod 440 can be precured with an adhesive. The bundled rovings 405 may be secured to the rod via FRP rovings 442 wrapped circumferentially and/or helically around the bundled rovings 405.

Figure 4B:
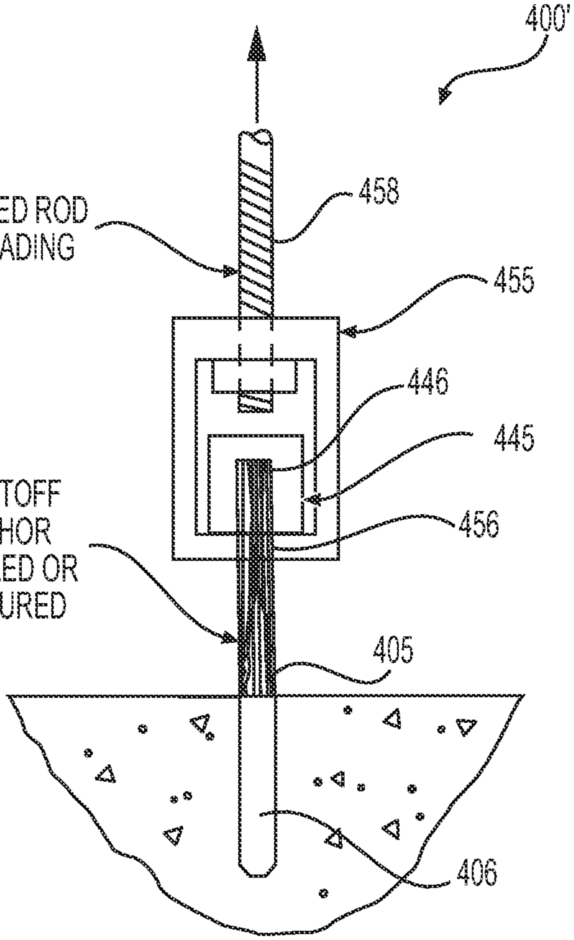
FIG. 4B illustrates a fifth exemplary field test FRP anchor assembly in accordance with various aspects of the disclosure.

Referring now to FIG. 4B, a shop-fabricated FRP anchor 400' configured for field testing includes a first precured or field cured end portion 406 having a diameter and length sized to be inserted into a hole drilled in a concrete substrate and filled with adhesive. Rovings 405 of the FRP anchor 400' that extend from the precured end portion 406 are bundled and/or precured and extend into a bore 446 of a steel barrel 445. The anchor 400' may be potted in the steel barrel 445 with an adhesive. The barrel 445 can be disposed in a loading bracket 455, for example, by providing the barrel 445 with a larger transverse dimension than an opening 456 in the bracket 455 through which the bundled rovings 405 extend. Opposite the steel barrel 445, a threaded rod 458 may be secured to the loading bracket 455 and extend from the loading bracket 455 in a direction opposite to the precured end portion 406 of the field test anchor 400'. The threaded rod 458 can thus be coupled with a conventional center hole actuator and load cell (not shown) so that the strength of the anchor 400' can be measured.

Thus, as shown in FIGS. 1-4, a field test FRP anchor 100, 200, 300, 400, 400' according to the disclosure includes a precured end portion 106, 206, 306, 406 that is configured to be field installed by being embedded into existing concrete per manufacturer's instructions and a non-embedded second end 104, 204, 304, 404 that is configured to be connected to the specially designed connection hardware 150, 250, 350, 450, 455. The connection between the test anchor 100, 200, 300, 400, 400' and the connection hardware 150, 250, 350, 450, 455 can be either directly through a loop at the end of the field test anchor, either reinforced or unreinforced, or mechanically through steel plates, steel hollow rod or some other connecting device. It should be appreciated that the field test anchor can be either field saturated or shop fabricated with or without a precured end.

Figure 5:
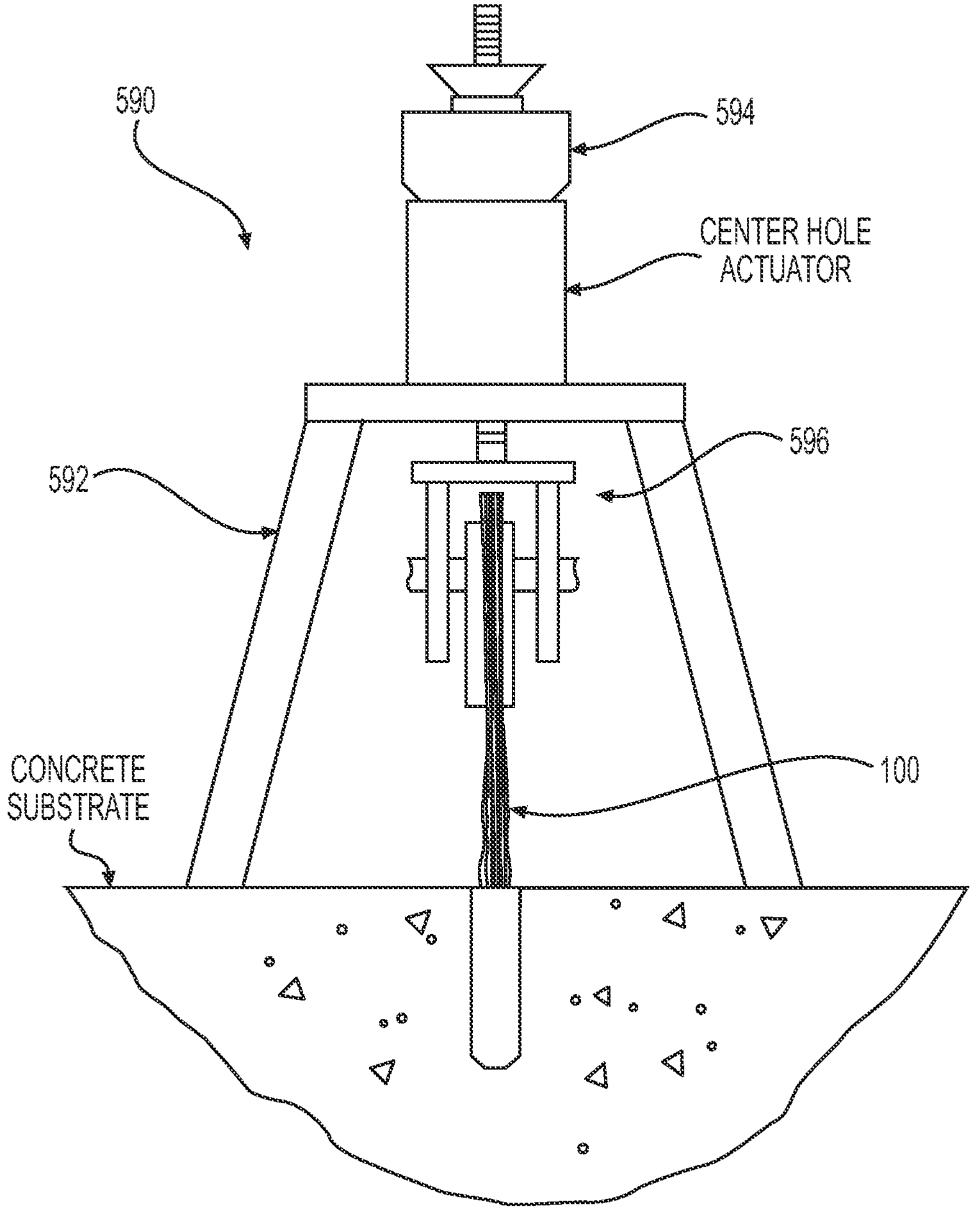
FIG. 5 illustrates a conventional setup for field testing precured FRP anchors.
Figure 6A:
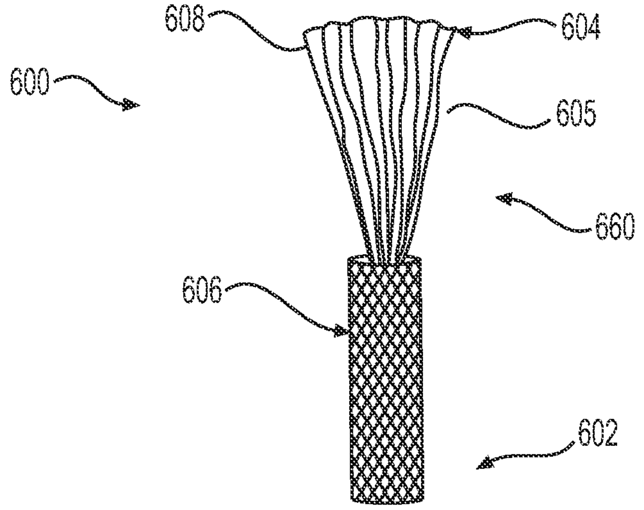
FIG. 6A (PRIOR ART)
FIGS. 6A and 6B illustrate a conventional shop fabricated FRP anchor.
Figure 6B:
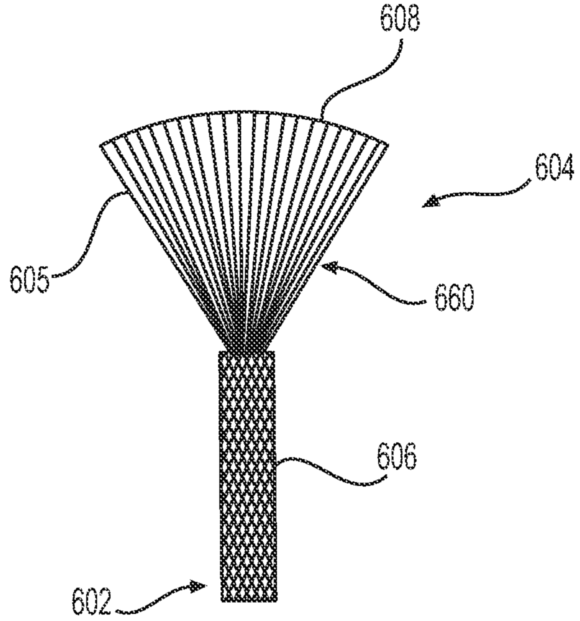
FIG. 6B (PRIOR ART)

Referring to FIG. 5, a typical field test setup includes a test apparatus 590 with a loading rig or support frame 592, a load cell 594, and required connection hardware 596, such as a test bracket, that connects the test equipment/apparatus directly to the field test anchor 100, 200, 300, 400, 400'. The test apparatus 590 is mounted on the existing concrete element 590 directly above the field test anchor 100, 200, 300, 400, 400'. The field test anchor 100, 200, 300, 400, 400' is mechanically fastened to the test apparatus 590 via the provided hardware. The load cell 594 engages the field test anchor 100, 200, 300, 400, 400' by pulling on the connection hardware 596 while being supported on the loading rig or support frame 592.

With reference now to FIGS. 7A-7H, a process for making the field test anchor 100 is illustrated and described. The process requires a precured FRP anchor having a desired diameter, precured length, and overall length and two plates 110, for example, rectangular steel plates.

In various optional embodiments, a hole 114 may be drilled in a top end of the one of the plates 110, i.e., an end of the plate 110 that will be distal to the precured end portion 106 of the FRP field test anchor 100. In some aspects, edges of the inside face 111 (i.e., the face to be placed in contact with the FRP anchor 100) may be chamfered at top and bottom of the plates 110.

Figure 7A:
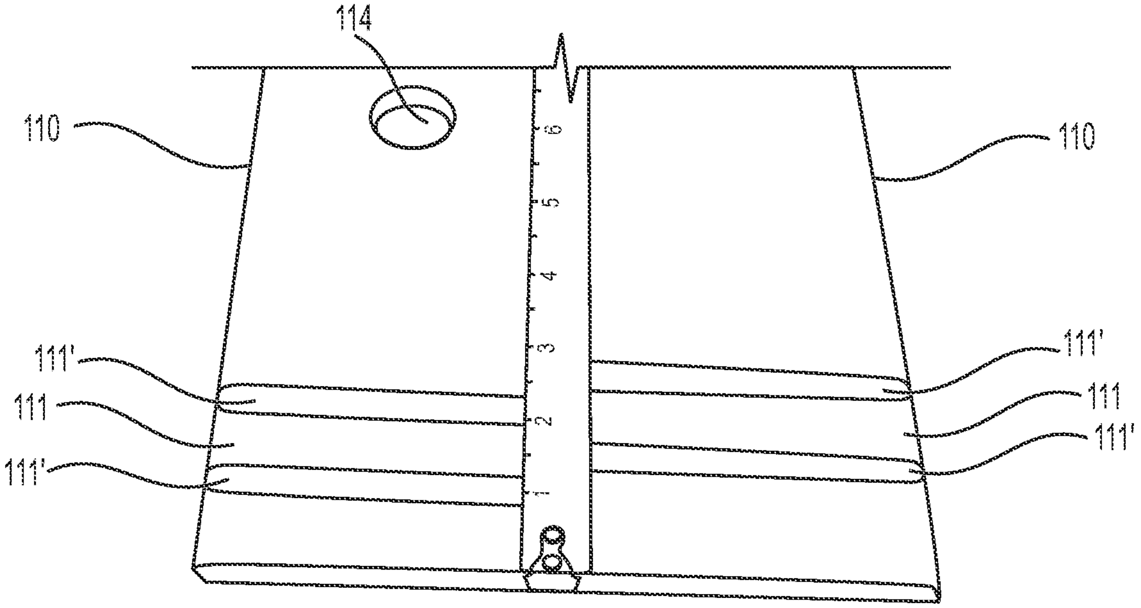
FIGS. 7A-7H illustrate a process for making the exemplary field test FRP anchor of FIG. 1A.

As shown in FIG. 7A, grooves or slots 111' may be milled on the inside face 111 of one or both of the steel plates 110. The grooves/slots of one plate may be offset from the grooves/slots of the other plate. In some aspects, the inside faces of the plates 110 may be sandblasted, or roughened with other mechanical means, to form a desired rough profile to improve the an adhesive bond between the plates and the anchor.

Figure 7B:
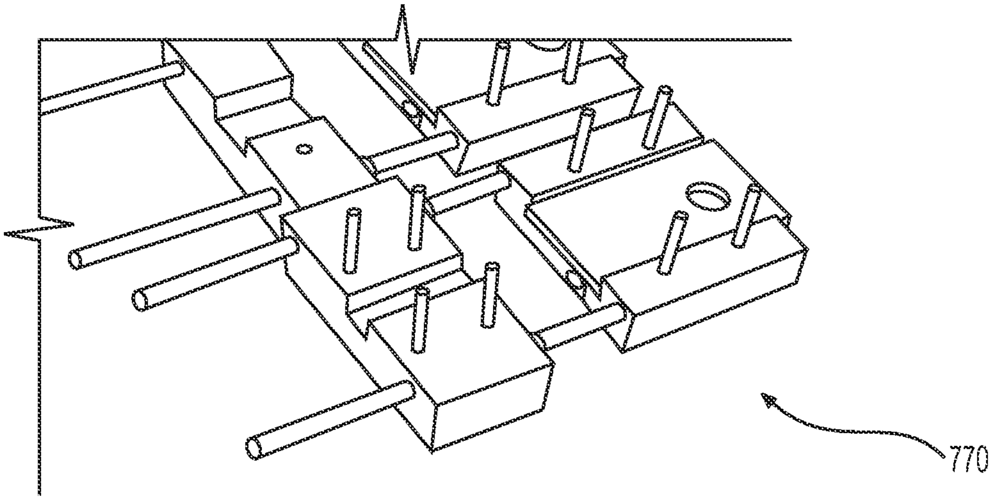
Figure 7C:
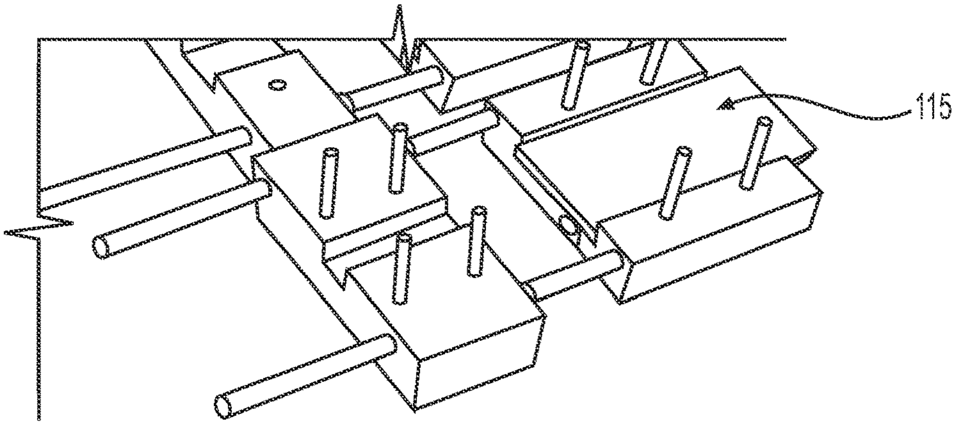

Referring now to FIG. 7B, the plates 110 are positioned in a jig 770 configured for making field test anchors, and a primer layer of adhesive is applied to the inside face of each plate 110. As shown in FIG. 7C, in some embodiments, an FRP fabric 115 saturated with adhesive can be placed on the inside face of each plate 110. The FRP fabric 115 may be sized to match the plate 110.

Figure 7D:
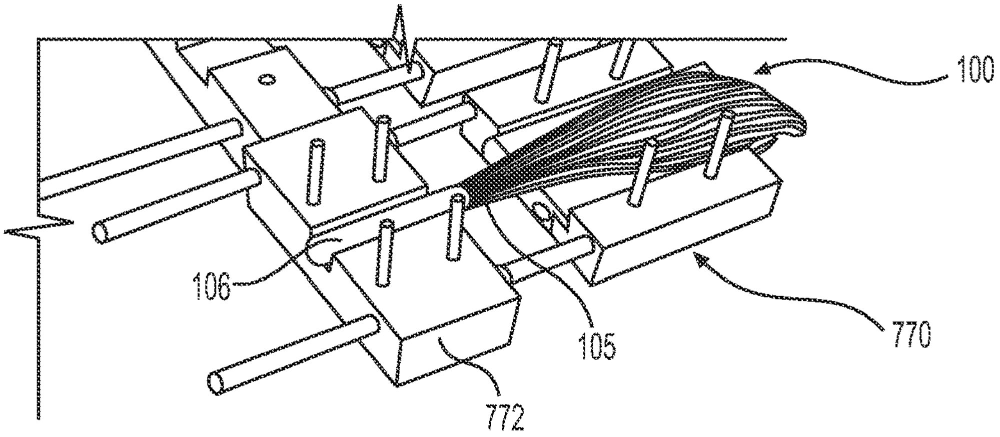
Figure 7E:
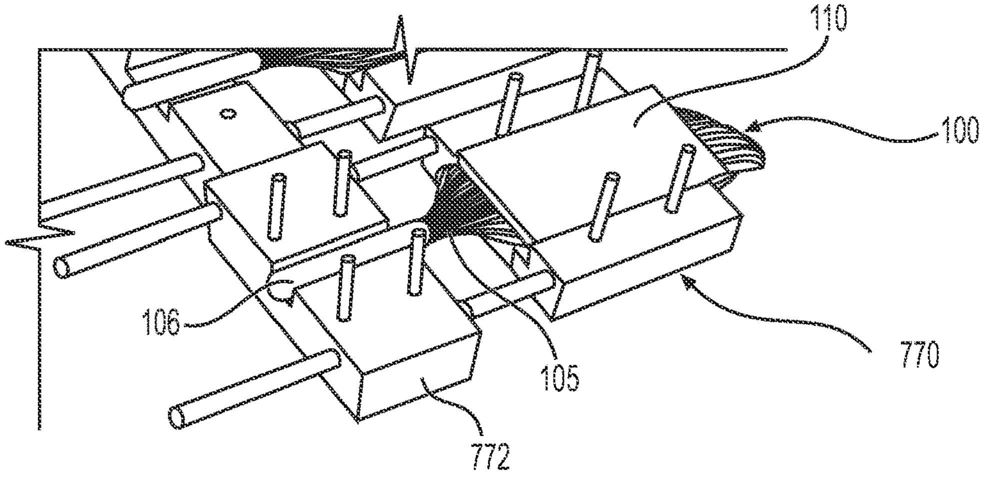
Figure 7F:
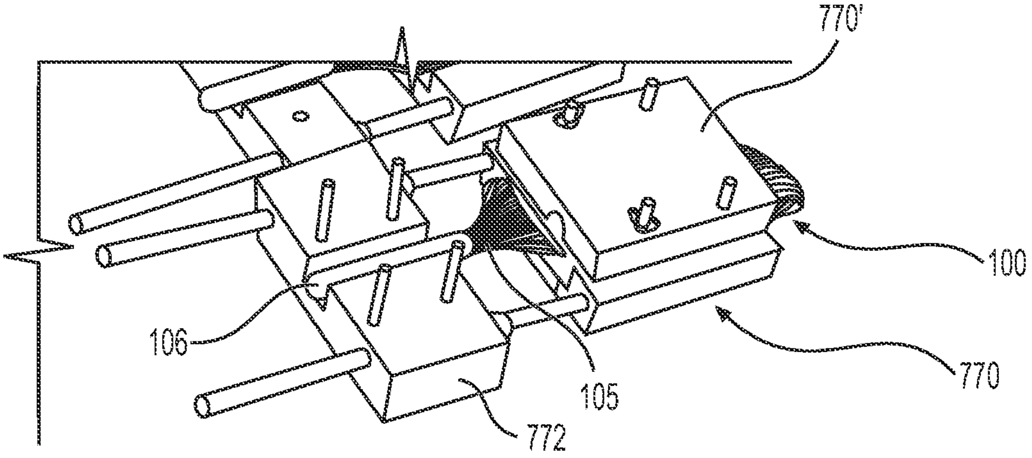

As shown in FIG. 7D, the uncured rovings 105 of the anchor 100 are saturated with adhesive, the precured end portion 106 of the anchor 100 is placed in a saddle end 772 of the jig 770, and the saturated rovings 105 are splayed onto one of the steel plates 110. Referring to FIG. 7E, the other one of the steel plates 110 is placed over the splayed saturated rovings and, as shown in FIG. 7F, the jig 770 is closed by placing a second jig form 770' over the plates 110 and the two jig forms are tightened together, for example, via a bolt and wing nut, to lock the plates 110 and splayed rovings 105 in place.

Figure 7G:
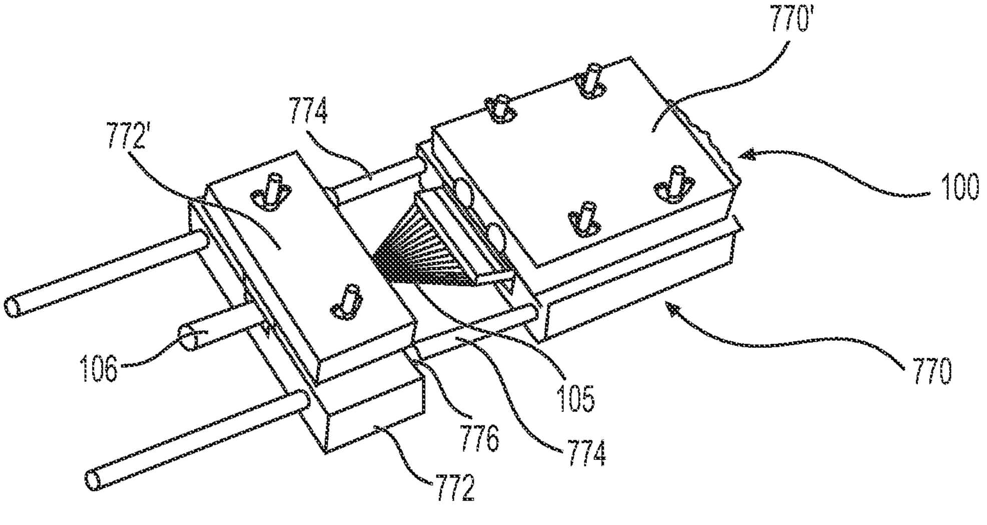

Referring to FIG. 7G, the precured end portion 106 of the anchor 100 is covered by a top saddle portion 772', and the two saddle portions are tightened, for example, via a bolt and wing nut, to clamp the precured end portion 106 sufficiently to prevent movement of the precured end portion 106. The anchor 100 is tensioned by moving the jig form 770 that clamps the steel plates 110 away from the saddle end 772 that clamps the precured end portion 106. For example, the jig form 770 may be fixed coupled with a pair of threaded rods 774, and the threaded rods 774 are slidingly received by the saddle end 772. A nut 776 may be threaded on each rod 774 between the jig form 770 and the saddle end 772. The nuts 776 are configured to urge the saddle portion 772 away from the jig form 770 to a desired tension as the nuts 776 are rotated relative to the threaded rods 774.

Figure 7H:
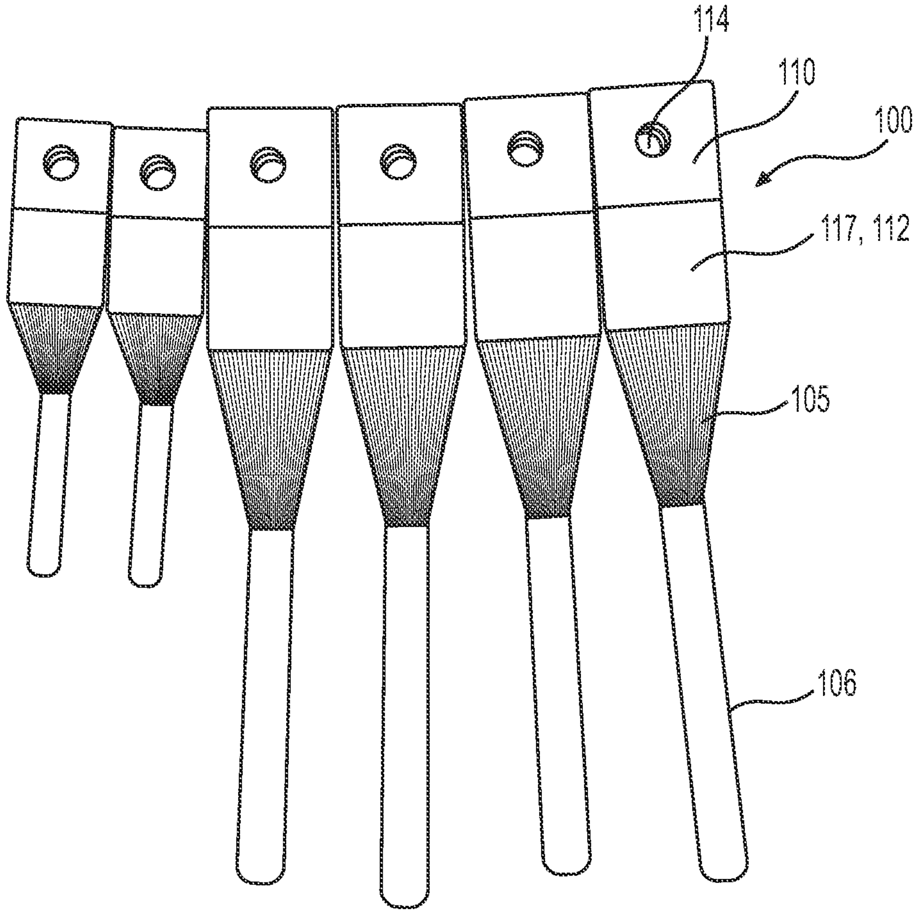

The tensioned anchor 100 is then cured to cure the plates 110 to the splayed rovings 105 at the second end 104 of the anchor 100. After curing, the anchor 100 is removed from the jig form 770 and the saddle portion 772. To prevent the plates 110 from separating from the splayed rovings 105 during field testing, the ends of the plates 110 nearest to the precured end portion 106 can be clamped together by a clamping structure 117. The clamping structure 117 may include FRP rovings and/or FRP fabric wrapped around the ends of the plates 110 nearest to the precured end portion 106, as shown in FIGS. 1A and 7H. The FRP rovings and/or FRP fabric are cured prior to field testing. Alternatively, the ends of the plates 110 nearest to the precured end portion 106 can be clamped together by any conventional mechanical clamping structure (not shown).

As described in the background section above, there is currently no way of testing FRP anchors in the field for quality assurance to verify that the anchor and installation meet or exceed the required design criteria of the anchors for compliance with the code/standard being used for design. Where it is the accepted code, Chapter 17 of the International Building Code can be used for field inspection testing for materials that are not addressed in the code. The invention described herein allows currently used FRP anchors to be tested in the field similar to what is presently done for steel anchors and connectors that are being commonly used in the construction industry, thus providing a pathway to compliance with the requirements of Chapter 17 of the IBC and other standards.

It will be apparent to those skilled in the art that various modifications and variations can be made to the anchors and connectors, methods of making anchors and connectors, and processes for reinforcing a structure of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification, as well as from the practice of the invention disclosed herein. It is intended that the specification and examples be considered as exemplary only.

What is claimed is:

1. A fiber reinforced polymer (FRP) test anchor configured for field testing, the FRP test anchor comprising:

an FRP anchor comprising a plurality of rovings extending from a first end of the FRP test anchor to an opposite second end of the FRP test anchor;

a pair of metal plates at the second end of the FRP test anchor;

FRP rovings wrapped around the metal plates;

wherein the first end of the FRP test anchor comprises a cured end portion of the plurality of rovings of the FRP anchor;

wherein the plurality of rovings are splayed in a plane as the plurality of rovings extend from the cured end portion toward the second end of the FRP test anchor;

wherein the metal plates are disposed at opposite sides of the plane of the splayed rovings;

wherein the metal plates are cured to the splayed rovings;

wherein the FRP rovings are wrapped entirely around the metal plates and the splayed rovings that are clamped between the metal plates;

wherein the metal plates are configured to couple the FRP test anchor with a field test system; and wherein the metal plates are configured to permit the field test system to measure tensile strength of the FRP anchor.

2. The FRP test anchor of claim 1, wherein end portions of the metal plates nearest the cured end portion are stabilized or clamped together.

3. The FRP test anchor of claim 1, wherein at least one of the metal plates includes grooves cut into a side of the at least one of the metal plates facing the plurality of rovings.

4. The FRP test anchor of claim 1, wherein the metal plates comprise steel plates.

5. The FRP test anchor of claim 1, wherein surfaces of the metal plates facing the plurality of rovings comprise roughened surfaces.

6. The FRP test anchor of claim 5, wherein the roughened surfaces comprise sandblasted surfaces.

7. The FRP test anchor of claim 1, wherein the metal plates are spaced from the cured end portion by a predetermined distance.

8. The FRP test anchor of claim 1, wherein the splayed rovings are tensioned.

9. The FRP test anchor of claim 1, further comprising an FRP fabric between the plurality of rovings and a surface of at least one of the metal plates facing the plurality of rovings.

10. The FRP test anchor of claim 9, wherein the FRP fabric extends from a first end of the at least one of the metal plates to a second end of the at least one of the metal plates.

11. The FRP test anchor of claim 1, wherein the wrapped FRP rovings are cured to the metal plates.

12. The FRP test anchor of claim 1, wherein each of the metal plates includes a through hole.

13. The FRP test anchor of claim 12, wherein the through holes are aligned with one another.

14. A field test assembly comprising:

a field test system;

the FRP test anchor of claim 1 configured to be coupled with the field test system;

wherein the field test system is configured to measure the tensile strength of the FRP anchor.

15. The field test assembly of claim 14, wherein the field test system comprises a center hole actuator and load cell configured to be coupled with the metal plates of the FRP test anchor so as to permit the field test system to measure the tensile strength of the FRP anchor.

16. A method for measuring the tensile strength of a fiber reinforced polymer (FRP) anchor comprising:

providing the FRP test anchor of claim 1;

coupling the FRP test anchor with a field test system; and actuating the field test system to measure the tensile strength of the FRP anchor.

17. The method of claim 16, wherein the coupling step comprises coupling a center hole actuator and load cell with the metal plates of the FRP test anchor so as to permit the field test system to measure the tensile strength of the FRP anchor.

* * * * *